US010705059B2

(12) United States Patent
Jung et al.

(10) Patent No.: US 10,705,059 B2
(45) Date of Patent: Jul. 7, 2020

(54) GAS SAMPLE INJECTION DEVICE FOR GAS CHROMATOGRAPHIC ANALYSIS, AND METHOD THEREOF

(71) Applicant: LG CHEM, LTD., Seoul (KR)

(72) Inventors: Jong-Mo Jung, Daejeon (KR); Sung-Won Hong, Daejeon (KR); Jong-Hoa Ok, Daejeon (KR)

(73) Assignee: LG CHEM, LTD., Seoul (KR)

( * ) Notice: Subject to any disclaimer, the term of this patent is extended or adjusted under 35 U.S.C. 154(b) by 209 days.

(21) Appl. No.: 15/766,315

(22) PCT Filed: Oct. 6, 2016

(86) PCT No.: PCT/KR2016/011214
§ 371 (c)(1),
(2) Date: Apr. 5, 2018

(87) PCT Pub. No.: WO2017/061803
PCT Pub. Date: Apr. 13, 2017

(65) Prior Publication Data
US 2018/0299414 A1  Oct. 18, 2018

(30) Foreign Application Priority Data

Oct. 6, 2015  (KR) .......................... 10-2015-0140638

(51) Int. Cl.
*G01N 30/20* (2006.01)
*G01N 30/16* (2006.01)
(Continued)

(52) U.S. Cl.
CPC ............. *G01N 30/20* (2013.01); *G01N 30/16* (2013.01); *G01N 2030/025* (2013.01);
(Continued)

(58) Field of Classification Search
CPC .. G01N 30/20; G01N 30/16; G01N 2030/207; G01N 2030/202;
(Continued)

(56) References Cited

U.S. PATENT DOCUMENTS

| 5,166,076 A *   | 11/1992 | Muller ............... G01N 30/20 422/88 |
| 10,192,726 B1 * | 1/2019  | Wiederin ............ H01J 49/0454 |
| 2007/0075242 A1 | 4/2007  | Kruis |
| 2014/0147927 A1*| 5/2014  | Su ..................... G01N 33/225 436/143 |
| 2014/0241394 A1 | 8/2014  | Olson |

FOREIGN PATENT DOCUMENTS

| CN | 202661451 U  | 1/2013 |
| CN | 104914198 A  | 9/2015 |

(Continued)

*Primary Examiner* — Suman K Nath
(74) *Attorney, Agent, or Firm* — Dentons US LLP

(57) ABSTRACT

The present invention relates to a gas sample injection apparatus for gas chromatography analysis comprising: a gas collecting tube for collecting the gas inside a cell and regulating it with an open/close valve to discharge a portion of the collected gas as a gas sample; a gas sampling loop for collecting the gas sample injected into a gas chromatograph; a first switching valve for regulating an injection of the gas sample filled in the gas sampling loop into the column of the chromatography with a carrier gas; a second switching valve connected to the gas collection tube and for regulating a diffusion of the gas sample into the gas sampling loop; and a vacuum pump for vacuum-depressurizing the gas sampling loop, and an injection method using the same.

8 Claims, 5 Drawing Sheets

(51) Int. Cl.
  *H01M 10/48* (2006.01)
  *G01N 30/02* (2006.01)
  *H01M 10/0525* (2010.01)

(52) U.S. Cl.
  CPC . *G01N 2030/201* (2013.01); *G01N 2030/202* (2013.01); *G01N 2030/207* (2013.01); *H01M 10/0525* (2013.01); *H01M 10/48* (2013.01)

(58) Field of Classification Search
  CPC ......... G01N 2030/201; G01N 35/1097; G01N 1/38; G01N 2001/383; G01N 2030/025; H01M 10/0525; H01M 10/48; H01J 49/003; H01J 49/0454; H01J 49/0495; H01J 49/105
  See application file for complete search history.

(56) References Cited

FOREIGN PATENT DOCUMENTS

| | | |
|---|---|---|
| EP | 1764603 A1 | 3/2007 |
| JP | 1993-052719 A | 3/1993 |
| JP | 06-186007 A | 7/1994 |
| JP | H0968486 A | 3/1997 |
| JP | 2000009613 A | 1/2000 |
| JP | 2005300362 A | 10/2005 |
| JP | 2008-026187 A | 2/2008 |
| KR | 1019990065082 | 8/1999 |
| KR | 10-2000-0002427 A | 1/2000 |
| KR | 200293795 Y1 | 7/2002 |
| KR | 10-2009-0069360 A | 7/2009 |
| KR | 10-2015-0032034 A | 3/2015 |

\* cited by examiner

[Fig. 1]
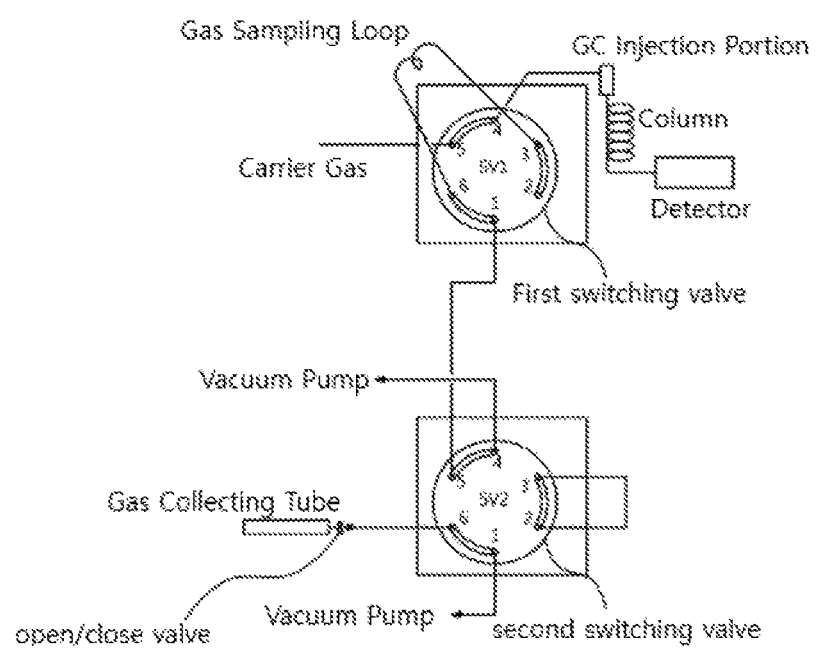

[Fig. 2]
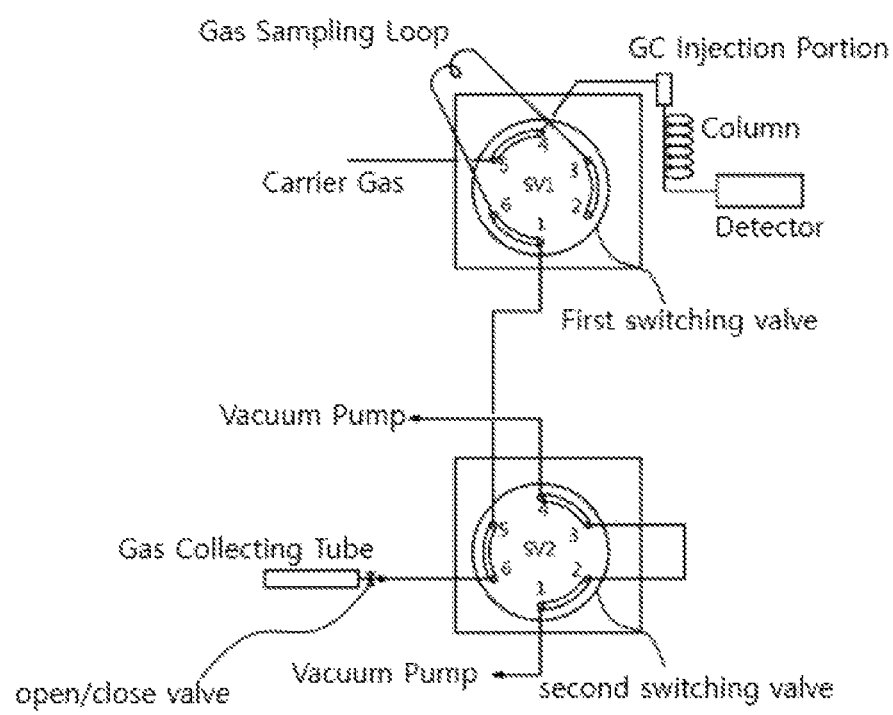

[Fig. 3]
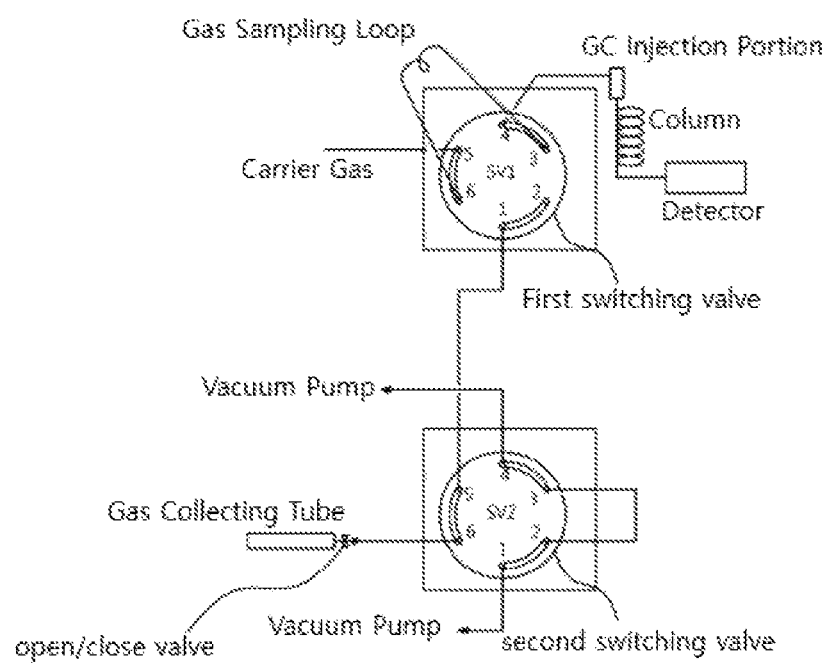

[Fig. 4]
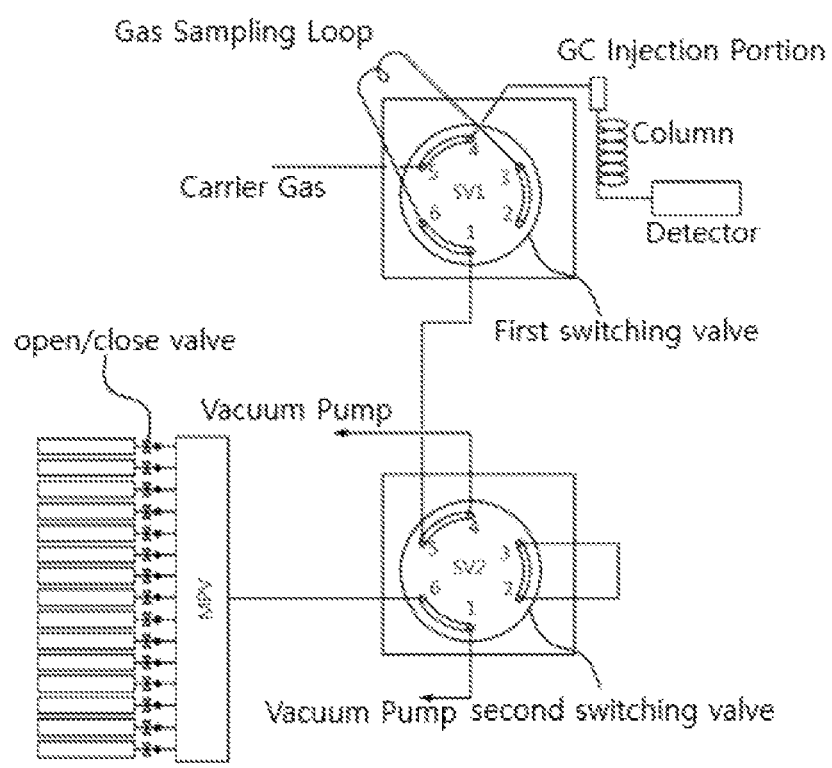

[Figure 5]
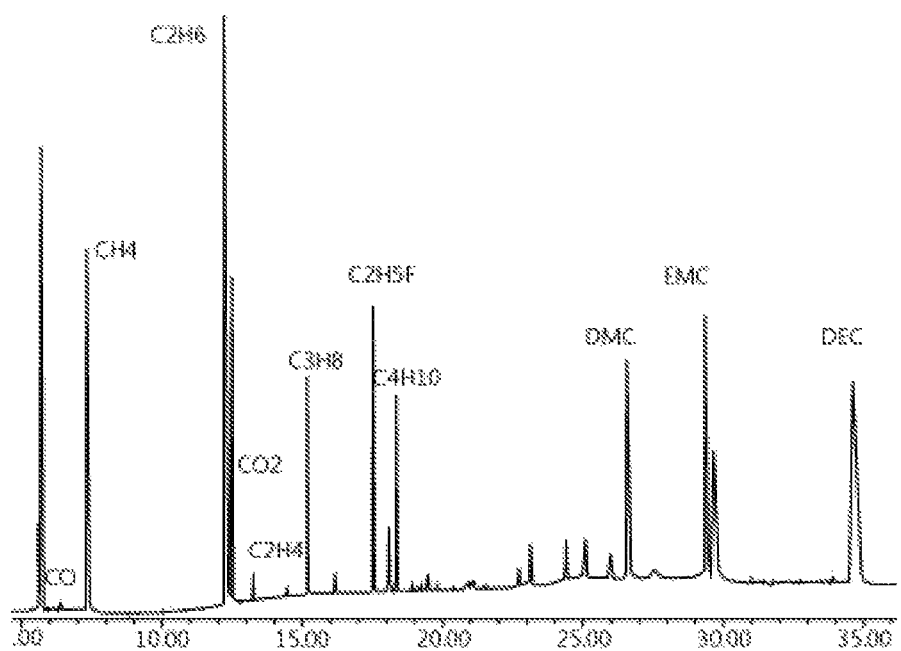

GAS SAMPLE INJECTION DEVICE FOR GAS CHROMATOGRAPHIC ANALYSIS, AND METHOD THEREOF

TECHNICAL FIELD

This application is a National Stage Application of International Application No. PCT/KR2016/011214 filed Oct. 6, 2016, and claims the benefit of Korean Patent Application No. 10-2015-0140638 filed Oct. 6, 2015, all of which are hereby incorporated by reference in their entirety for all purposes as if fully set forth herein.

The present invention relates to a gas sample injection apparatus for gas chromatography (GC) analysis. More specifically, it relates to a gas sample injection apparatus for automatically injecting a low pressure gas sample into GC.

BACKGROUND ART

In an operation of a lithium-ion battery, gas components such as hydrogen, oxygen, nitrogen, carbon monoxide, carbon dioxide, methane, ethane, ethylene, propane and the like are generated. Information on the composition and content of such generated gas may be usefully available for research and development of a cell material, optimization of cell manufacturing processes, identification of a cause of a cell failure, etc.

In order to analyze the gas generated inside the cell, the gas is diffused in a sealed space and the gas sample is collected into a gas collecting tube, and the collected gas is injected into and analyzed by a gas chromatograph. However, since a pressure of the gas diffused in the sealed space is low, the gas is not automatically filled into the sampling loop of the gas chromatographic apparatus from the gas collecting tube, and thereby, there is a problem that the gas is forcibly filled. Such a problem may be exacerbated especially at low pressure gas below normal pressure.

Therefore, it is urgent to investigate an apparatus capable of automatically injecting a gas into a gas chromatograph even at low pressure and automatically processing a large number of gas samples for analysis of the large number of gas samples.

DISCLOSURE

Technical Problem

In order to solve the problems of the prior arts as described above, an object of the present invention is to provide an apparatus and a method capable of automatically injecting the gas generated inside the cell into a gas chromatography even for a gas of low pressure for the analysis of the gas, and automatically processing a large number of gas samples for analysis of the large number of gas samples.

Technical Solution

In order to achieve the above object, the present invention provides a gas sample injection apparatus for gas chromatography analysis comprising: a gas collecting tube for collecting the gas inside a cell and regulating it with an open/close valve to discharge a portion of the collected gas as a gas sample; a gas sampling loop for collecting the gas sample injected into a gas chromatography; a first switching valve for regulating an injection of the gas sample filled in the gas sampling loop into the column of chromatography with a carrier gas; a second switching valve connected to the gas collection tube and adapted to regulate diffusion of the gas sample into the gas sampling loop; and a vacuum pump for vacuum-depressurizing the gas sampling loop.

Further, the present invention provides a method for injecting a gas sample for gas chromatography analysis using said gas sample injection apparatus.

Advantageous Effects

According to the gas sample injection apparatus for gas chromatography analysis of the present invention, there are advantages that it is possible to automatically inject a gas into a gas chromatograph even at low pressure and to automatically process a large number of gas samples for analysis of the large number of gas samples.

DESCRIPTION OF DRAWINGS

FIG. 1 is a figure representing a state of a gas sample injection apparatus according to an embodiment of the present invention.

FIG. 2 is another figure representing a state of a gas sample injection apparatus according to an embodiment of the present invention.

FIG. 3 is the other figure representing a gas sample injection apparatus according to an embodiment of the present invention.

FIG. 4 is a figure representing a state of a gas sample injection apparatus according to another embodiment of the present invention.

FIG. 5 is a graph representing the analysis results of the gas samples analyzed according to embodiments of the present invention.

MODE FOR INVENTION

Hereinafter, a gas sample injection apparatus for gas chromatography analysis and a gas sample injection method using the same according to the present invention will be described in detail.

The following detailed description is only an example of the present invention. Thus, although there is a definite expression, it does not limit the scope of the right defined by the claims.

Throughout the figures of the present invention, similar reference numbers refer to the similar elements.

In the present invention, the term "and/or" means including any one or a combination of a plurality of the described contents.

In the present invention, when an element is referred to as being "connected" or "coupled" to another element, it is understood that the element may be directly connected or coupled to the another element or be connected or coupled to another element via the other element.

In the present invention, the singular expressions include plural expressions unless otherwise specified.

In the present invention, the terms "comprising", "including", or "having" mean that there is a feature, a numerical value, a step, an operation, an element, a component or a combination thereof described in the specification, and do not preclude a possibility that other features, numbers, steps, operations, components, parts, or combinations thereof may be present or added.

In the present invention, "chromatography" refers to physical separation in which a single component is separated from an analyte using the difference in affinity between a stationary phase and a mobile phase of the analyte to be analyzed and particularly refers to gas chromatography in case that the mobile phase is a gas phase (gas), and the gas chromatography may include the case that the stationary phase is a liquid phase or a solid phase.

In the prior art, in order to analyze information on composition and content of gas components generated inside a cell during an operation of a lithium-ion battery, with a gas sample injection apparatus for gas chromatography analysis, the gas generated inside the cell and the carrier gas were sequentially injected by using one switching valve and then the gas chromatography was carried out for analysis. However, according to such method, there is a problem that it can be applied only when the pressure of the generated gas is higher than that of the carrier gas or when the gas flow is continuous.

Accordingly, the present inventors have made an effort to solve the above-mentioned problems, and have found that this can be solved by controlling the open/close of two switching valves.

More specifically, the present invention is featured by a gas sample injection apparatus for gas chromatography analysis comprising: a gas collecting tube for collecting the gas inside a cell and regulating it with an open/close valve to providing a portion of the collected gas as a gas sample; a gas sampling loop for collecting the gas sample injected into a gas chromatograph; a first switching valve for regulating an injection of the gas sample filled in the gas sampling loop into the column of chromatography with a carrier gas; a second switching valve connected to the gas collection tube and adapted to regulate diffusion of the gas sample into the gas sampling loop; and a vacuum pump for vacuum-depressurizing the gas sampling loop.

Hereinafter, the present invention will be described more specifically with reference to the figures.

First, the gas collecting tube of the present invention collects the gas inside the cell and then discharges a portion of the collected gas as the gas sample by regulation of the open/close valve.

There is no particular limitation on the way in which the gas collecting tube collects the gas inside the cell as long as it is the method used in the art, and preferably, the same method as the gas collecting method may be used in K. Kumai et al., Journal of Power Sources 81-82 (1999) 715-719 may be applied.

As shown in FIG. 1, the gas collecting tube is connected to the second switching valve through an open/close valve, and the gas inside the cell is collected and then a portion of the gas is moved as a gas sample.

As shown in FIG. 4, the gas collecting tube of the present invention may be installed as a plurality of gas collecting tubes and discharge a plurality of gases as gas samples, and preferably, the plurality of gas collecting tubes may have the form of a multi-position valve (MPV).

In such a case, a function of automatically injecting a plurality of gas samples may be realized by providing a multi-position valve (MPV) on one side of a switching valve, for example, a second switching valve, the process of injecting the gas sample from the gas collection tube into a gas chromatograph is the same.

Further, in order to sequentially inject a plurality of gas samples, it may be implemented by inputting the position number of the MPV connected to each gas collector, in a control program for a gas chromatograph.

There is no particular limitation on the plurality of gases as long as it is a gas inside the lithium-ion battery, and preferably may be one or more selected from the group consisting of hydrogen, oxygen, nitrogen, carbon monoxide, carbon dioxide, methane, ethane, ethylene, and propane.

Further, the pressure of the gas may be lower than the normal pressure, and preferably lower than the pressure of the carrier gas.

The material, shape and volume of the gas collecting tube of the present invention are not limited, and the gas collecting tube may be made of a metal material such as stainless steel, copper steel, carbon steel, aluminum alloy, alloy steel, etc., or a polymer resin such as Polyether Ether Ketone (PEEK), Polyimide, etc. which has a strength such that the shape is not deformed even in a vacuum state, and it may have a form of a tube, a cylinder, a bottle or the like. The volume of the gas collection tube may influence on the accuracy and precision of the analysis and thus should be suitably regulated and be preferably about 1 to 10 mL.

The gas collecting tube, the second switching valve, and the tube used for connecting the second switching valve and the first switching valve may be made of a metal material such as stainless steel, copper steel, carbon steel, aluminum alloy, alloy steel, etc., or a polymer resin such as Polyether Ether Ketone (PEEK), Polyimide, etc. such that the shape is not deformed even in a vacuum state or high temperature. There are no particular limitations on the inner diameter and the outer diameter of the tube, and preferably a tube having the inner diameter of 0.5 mm to 1.5 mm may be used.

Next, the gas sampling loop of the present invention collects gas samples to be injected into a gas chromatograph. The material of the gas sampling loop of the present invention is not limited, and the gas sampling loop may be made of a metal material such as stainless steel, copper steel, alloy steel, etc., such that the shape and the volume are not deformed in vacuum-depressurizing, and the inside volume may be within 10 to 1000 μL.

As shown in FIG. 1, the gas sampling loop is connected to a first switching valve, and as shown in FIG. 2, as the second switching valve is opened, the gas sample discharged from the gas collecting tube is filled up. The gas sample collected in the sampling loop may be injected into the column with the carrier gas of the gas chromatography as the first switching valve is opened, as shown in FIG. 3.

Next, the first switching valve of the present invention regulates the injection of the gas sample filled in the gas sampling loop into the column of chromatography using the carrier gas.

As shown in FIG. 3, the gas sample collected in the sampling loop is injected into the column with the carrier gas of the gas chromatography as the first switching valve is opened. The first switching valve can regulate such a case.

The first switching valve is not particularly limited as long as it is a valve used in the art, and preferably, a six-port valve or a nine-port valve may be used.

Next, the second switching valve of the present invention is connected to the gas collection pipe and regulates the gas sample to diffuse into the gas sampling loop.

As shown in FIG. 2, as the second switching valve opens, the gas sample discharged from the gas collection tube is filled into a gas sampling loop. The second switching valve can regulate such a case.

The second switching valve is not particularly limited as long as it is a valve used in the art, and preferably, a six-port valve or a nine-port valve may be used.

The vacuum pump of the present invention vacuum-depressurizes the gas sampling loop. The vacuum pump can be used without any particular limitation as long as it can vacuum-depressurize the gas sampling loop to a pressure lower than the pressure of the gas collection tube, and preferably, the vacuum pump that can reduce the pressure of the gas sampling loop to 1 torr or less, may be used. Also, The vacuum pump may be connected anywhere in the apparatus if the gas sampling loop can be vacuum-depressurized, and preferably, the vacuum pump may be connected to a second switching valve for the vacuum-depressurization and thereby vacuum-depressurize the gas sampling loop.

According to the above configurations of the gas sample injection apparatus for gas chromatography analysis of the present invention, after the gas sampling loop is vacuum-depressurized by using the vacuum pump, the second switching valve is opened and thereby the generated gas of the gas collecting tube is diffused to and filled in the gas sampling loop, and then the first switching valve is opened to inject the generated gas filled in the gas sampling loop into the gas chromatography with the carrier gas.

The apparatus for injecting a gas sample for gas chromatography analysis of the present invention may further comprise a control device for controlling the open/close of the first and second switching valves in addition to the above configurations. By controlling the time difference between open/close of the two switching valves, by controlling the time difference between open/close of the first switching valve and the second switching valve, the vacuum-depressurization of the gas sampling loop, the connection of the gas collecting tube and the sampling loop, and the injection of the gas sample into the chromatography column may be controlled.

Another aspect of the present invention is to provide a method of injecting a gas sample for gas chromatography analysis using the gas sample injection apparatus of the present invention.

Specifically, a method of injecting a gas sample for gas chromatography analysis comprises: a) depressurizing the gas sampling loop using a vacuum pump; b) diffusing the generated gas of the gas collection tube into the gas sampling loop to be filled by opening the second switching valve; c) injecting the generated gas filled in the gas sampling loop to a gas chromatograph with a carrier gas by opening the first switching valve.

BEST MODE

Hereinafter, a preferred embodiment of the present invention will be described in order to facilitate understanding of the present invention. It will be apparent to the skilled person in the art that the following examples are illustrative of the present invention and various changes and modifications can be made within the scope and spirit of the present invention. Such changes and modifications are intended to fall within the scope of the claims.

EXAMPLE

GC-MSD Analysis Results of Gases Generated Inside a Lithium-Ion Battery Using an Automatic Gas Injection Apparatus A lithium-ion battery was manufactured by using a current collector and a Li-containing compound represented by $LiMnO_2$ as a positive electrode, using graphite as a negative electrode, using a polyolefin-based film as a separating film between the positive electrode and the negative electrode, and injecting a 1 M concentration of Li salt to a carbonate-based electrolyte. The gas generated inside of the lithium-ion battery was collected into a gas collecting tube. Here, the pressure of the gas collected in the gas collecting tube was 80 torr.

As shown in FIG. 1, after both the first and second switching valves are closed in the OFF states, the gas sampling loop became vacuum-depressurized using a vacuum pump (Edward Co., RV3) during one minute.

Thereafter, as shown in FIG. 2, after the second switching valve was opened in the ON state, the open/close valve of the gas collecting tube was opened so that the gas inside the gas collecting tube was diffused into the gas sampling loop. At this time, the first switching valve is closed in the OFF state.

Thereafter, as shown in FIG. 3, the second switching valve was opened in the ON state, and a gas sample was injected into the chromatography column by applying He, which is a carrier gas, with the pressure of 13.0 psi.

The gas generated inside the lithium-ion battery, which was injected as described in the above, was analyzed by GC-MSD. The analyzed results are shown in FIG. 5.

Through the experiment described as the above, it was recognized that it is possible to automatically inject a gas even at a pressure lower than that of the carrier gas, into a gas chromatograph.

The invention claimed is:

1. A gas sample injection apparatus for gas chromatography analysis comprising:
   a plurality of gas collecting tubes for collecting gas inside a cell and regulating it with an open/close valve to discharge a portion of the collected gas as a gas sample;
   a gas sampling loop for collecting the gas sample injected into a gas chromatograph;
   a first switching valve connected to the gas sampling loop for regulating an injection of the gas sample filled in the gas sampling loop into a column of the chromatograph with a carrier gas;
   a second switching valve connected to the gas collecting tubes connected through the open/close valve and for regulating a diffusion of the gas sample into the gas sampling loop; and
   a vacuum pump for vacuum-depressurizing the gas sampling loop;
   wherein the plurality of gas collecting tubes are in the form of a multi-position valve (MPV) thereby enabling a plurality of gases to be discharged as gas samples; and the plurality of gas collecting tubes are connected to a plurality of gas collectors.

2. The gas sample injection apparatus for gas chromatography analysis according to claim 1, further comprising a control device for controlling the open/close of the first and second switching valves.

3. The gas sample injection apparatus for gas chromatography analysis according to claim 1, wherein a vacuum pump vacuum-depressurizes the gas sampling loop by vacuum-depressurizing by being connected to the second switching valve.

4. The gas sample injection apparatus for gas chromatography analysis according to claim 1, wherein the gas may be one or more selected from the group consisting of hydrogen, oxygen, nitrogen, carbon monoxide, carbon dioxide, methane, ethane, ethylene, and propane.

5. The gas sample injection apparatus for gas chromatography analysis according to claim 1, wherein by controlling the time difference between open/close of the first switching valve and the second switching valve, the vacuum-depressurization of the gas sampling loop, the connection of the gas collecting tubes and the gas sampling loop, and the injection of the gas sample into the chromatography column are controlled.

6. The gas sample injection apparatus for gas chromatography analysis according to claim 1, wherein the pressure of the gas in the gas collection tubes are lower than the pressure of the carrier gas.

7. The gas sample injection apparatus for gas chromatography analysis according to claim 1, wherein the first switching valve and the second switching valve are a six-port valve or a nine-port valve.

8. A method for injecting a gas sample for gas chromatography analysis using the gas sample injection apparatus according to claim 1, the method comprising:
   a) depressurizing the gas sampling loop with the vacuum pump;
   b) diffusing a generated gas of the gas collection tubes into the gas sampling loop to be filled by opening the second switching valve; and
   c) injecting the generated gas filled in the gas sampling loop to a gas chromatograph with a carrier gas by opening the first switching valve.

* * * * *